Feb. 14, 1950  G. L. FLEMING  2,497,494
STALL WARNING DEVICE FOR AIRPLANES
Filed Sept. 3, 1947
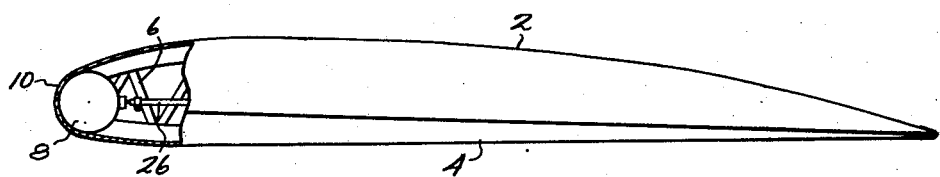
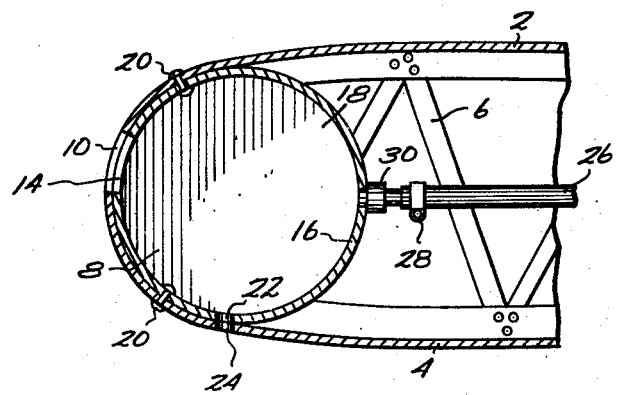
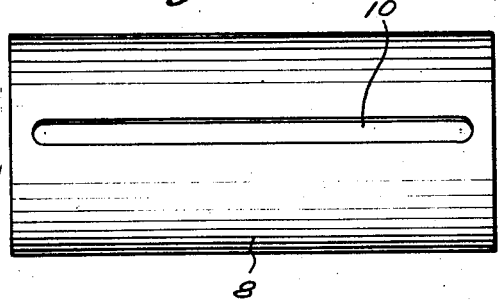 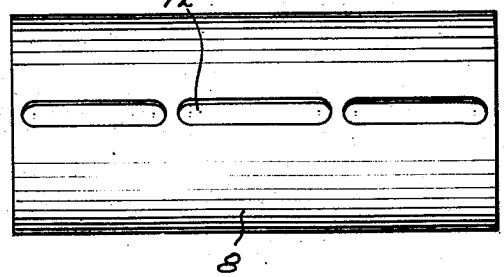
INVENTOR.
Glen L. Fleming,
BY Victor J. Evans & Co.
ATTORNEYS Patented Feb. 14, 1950

2,497,494

UNITED STATES PATENT OFFICE 2,497,494

STALL WARNING DEVICE FOR AIRPLANES

Glen L. Fleming, San Leandro, Calif.

Application September 3, 1947, Serial No. 771,917

3 Claims. (Cl. 244—1)

My present invention relates to an improved stall warning device for airplanes of the type involving no complicated mechanical devices but the extremely simple and operable construction built into the leading edge of the airplane wing which will effect an audible signal to the pilot when the plane assumes a previously determined dangerous position.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is an end elevational view of a wing partially broken away to show the warning device.

Fig. 2 is an enlarged sectional view transversely of the device.

Fig. 3 is a front elevational view.

Fig. 4 is a front elevational view of a modified form.

Referring now to the drawings, I have illustrated the present preferred embodiment of my invention as used with a conventional airplane wing having top 2 and bottom 4 covers or skin with interior braces 6 and curved at 8 to form the leading edge.

I provide an elongated slot 10 or a series of shorter slots 12 above the horizontal center of the leading edge in communication through the aligned slot 14 with the cylinder 16 formed with closed ends 18 and riveted to the skin as at 20. A drain aperture 22 is aligned with an aperture 24 in the bottom skin 4.

A flexible tube 26 is secured to nipple 30 by clamp 28 and this tube extends to a point adjacent the pilot.

With the plane in normal level flight no sound is produced but if the plane should approach the stall angle the air pressure blowing over the edges of the slot produces a whistle in the cylinder and the sound waves amplified by the cylinder will travel through the tube to be heard by the pilot warning him of the unsafe position of the ship.

It will be clear that several of the cylinders 16 may be employed as appears necessary or desirable, and the formation is not limited to a cylindrical shape. Although I have illustrated the present embodiment in a wing, the cylinder forming the sounding chamber may be located in other positions on the airplane.

In the case of multi-engine, pusher type, or jet propelled planes the cylinder may be installed in the curved nose of the fuselage or body, or in any other leading part of the airplane.

In some airplanes the flexible tube 26 and the nipple 30 may be omitted if the ends 18 are thin enough to vibrate with the sound if there is no structure inside the wing, or between the wing and the pilot's compartment to prevent sound waves from reaching the pilot.

Although it is not desired to limit the invention to a particular form of wing, a clear and sharp whistle was produced, as an example, by inserting a cylinder in an airplane wing having a clark Y airfoil with a 60 inch chord with the slot positioned in the leading edge and slightly above the chord axis of the wing. The whistle sounded when the angle of attack was 15 degrees and the stalling angle for a clark Y wing with an aspect ratio of 6 is about 17 degrees. The whistle did not sound at lower angles.

Having thus fully described my invention what I claim as new and desire to secure by Letters Patent is:

1. In an airplane stall warning device, the combination which comprises an airplane wing having a substantially semi-circular leading edge and in which the chord axis of the wing is in a plane extended through the center of the said semi-circular leading edge, said leading edge of the wing having a whistle producing slot in the forward surface thereof and said slot positioned slightly above the said chord axis whereby as the airplane approaches the stall angle thereof the whistle will produce a warning sound.

2. In an airplane stall warning device, the combination which comprises an airplane wing having a substantially semi-circular leading edge and in which the chord axis of the wing is in a plane extended through the center of the said semi-circular leading edge, said leading edge of the wing having a whistle producing slot in the forward surface thereof and said slot positioned slightly above the said chord axis, a cylinder in the leading edge of the wing and having a slot therein registering with the said whistle producing slot of the leading edge of the wing, and a tube extended from said cylinder for conveying the sound of the whistle to a pilot of the airplane on which the said wing is mounted whereby as the airplane approaches a stall angle thereof the whistle will provide a warning sound.

3. In an airplane stall warning device, the combination which comprises an airplane wing having a substantially semi-circular leading edge and in which the chord axis of the wing is in a plane extended through the center of the said semi-circular leading edge, said leading edge of the wing having a plurality of whistle producing slots in the forward surface thereof and said slots positioned slightly above the said chord axis whereby as the airplane approaches the stall angle thereof the whistle will produce a warning sound.

GLEN L. FLEMING.

No references cited.